H. G. HUGON.
RESILIENT ANTISKIDDING WHEEL.
APPLICATION FILED SEPT. 11, 1911.
1,025,400.
Patented May 7, 1912.
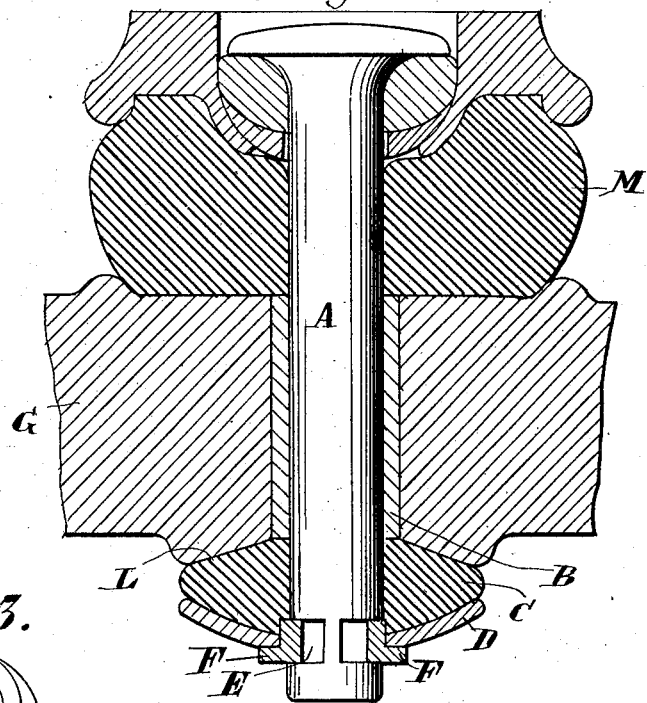
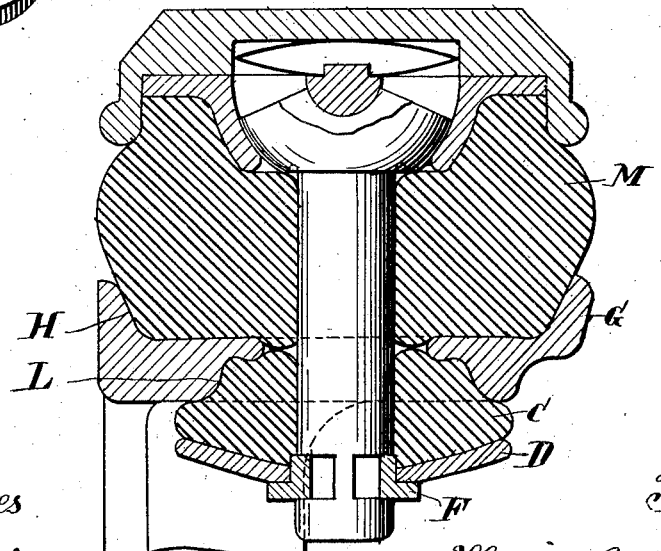
Witnesses
V. C. Landenberger
C. Everett Lancaster
Inventor
Henry Gaud Hugon
by D. Singer
Attorney

UNITED STATES PATENT OFFICE.

HENRY GAUD HUGON, OF CALAIS, FRANCE.

RESILIENT ANTISKIDDING WHEEL.

1,025,400.

Specification of Letters Patent.

Patented May 7, 1912.

Application filed September 11, 1911. Serial No. 648,703.

*To all whom it may concern:*

Be it known that I, HENRY GAUD HUGON, a citizen of the French Republic, and resident of 22 Rue de Vic, Calais, France, have invented certain new and useful Improvements in Resilient Antiskidding Wheels.

This invention relates to resilient antiskidding wheels of the kind which are fitted with an outer india-rubber block, the tread of which is furnished with a steel plate secured in position by means of a bolt which passes through said block, and a sleeve secured to the felly, the inner end of the bolt being fitted with a screw-nut and spring washer which presses against the inner side of the felly and thus presses the outer block in position. This before described arrangement has the following disadvantages: By the running of the wheel the rubber blocks become compressed and their subsequent expansion causes sudden shocks by the screwbolts on to the felly resulting in damage to the blocks and the felly. Further, the removal of worn out blocks and plates is more or less difficult by reason of the rust on the screws. While fitting new parts special provision has to be made for holding same in position so that the work is rendered onerous.

According to my present invention, and in order to obviate the aforesaid disadvantages, outer blocks furnished with plates having a cup-shaped middle portion and a bolt with partly spherical head, or a corresponding washer, are each combined with a lens-shaped inner rubber block held in position by a cup-shaped plate or washer which latter is secured by a divided ring on the correspondingly grooved inner end of the bolt.

The accompanying drawings show the embodiment of my invention.

Figure 1 is a longitudinal vertical section of one arrangement, and Fig. 2 is a cross-section of a modified arrangement. Fig. 3 is a perspective view of a divided ring used in connection with the device.

The tread plate shown in Fig. 1 is of known form and its bolt A passes through the felly or rim G in a sleeve B, the inner end of the said bolt being furnished with a counter rubber block C over which is placed the cup-shaped washer D. By compressing the two rubber blocks M and C, which can be effected by means of any suitable tool, facility will be afforded for the insertion, in the groove E, or reduced portion of a divided ring F preferably made in two parts. The rings are formed so as to be angular in cross-section, in order that the washer D will, at the expansion of the rubber blocks, be forced over the sleeve-like end of the divided ring F against the flange-like or outstanding portion thereof and in this manner be made to serve for effectively holding all the parts together. This automatic locking arrangement without screwing provides a very simple and reliable assemblage which can be readily put together and taken to pieces, and the parts thereof can be altered in shape without exceeding the scope of the invention. The rubber blocks can both be seated in spherical or other recesses provided in the inner and outer surfaces of the felly in order to dispense with the guide sleeve B, an arrangement of which is shown in Fig. 2. The felly is here formed with side flanges H which keep the outer blocks M in position, a central recess being provided to prevent creeping. At the inner side of the felly there is formed a circular recess L in which the counter or inner block C is lodged under the compression of the washer D, so that the centering of the bolt A is insured through the natural elasticity of the two rubber blocks.

I claim:

1. In a vehicle wheel, the combination with a rim having an aperture, a tread portion, a bolt for attaching said tread portion to said rim, having a reduced portion intermediate its ends and extending through said rim, a divided ring in engagement with one of the transverse walls of said reduced portion and provided with an outstanding portion, a resilient member interposed between said rim and the said outstanding portion of said divided ring, and a washer having an aperture for the reception of said divided ring and coacting with said resilient member to form a binding engagement between said ring and said apertured portion of said rim, substantially as and for the purpose set forth.

2. In a vehicle wheel, the combination of a rim having a recess at the inner and at the outer faces thereof and an aperture opening into both recesses, inner and outer resilient members positioned by said recesses and having an aperture opening into the said aperture in said rim but relatively smaller than the latter, a tread portion on the outer resilient member, a bolt operatively connected to said tread portion, passing through the said apertures in said resilient members and in engagement with the walls thereof, through the said aperture in said rim, and having a reduced portion adjacent the inner resilient member, a divided ring in engagement with the said reduced portion of said bolt and provided with outstanding portions, and a washer interposed in binding relation between the inner resilient member and said outstanding portions of said divided ring, substantially as and for the purpose set forth.

3. In a vehicle wheel, the combination of a rim having a recess at the inner and at the outer face thereof and an aperture opening into both recesses, inner and outer resilient members positioned by said recesses and having apertures opening into the said aperture in said rim but relatively smaller than the latter, a tread portion on the outer resilient member, a bolt operatively connected to said tread portion, passing through the said apertures in said resilient member in engagement with the walls thereof, through the said aperture in the said rim and means operatively connected to the free end of said bolt to bindingly confine said inner resilient member against said rim.

In testimony whereof, I have hereunto set my hand in presence of two witnesses.

HENRY GAUD HUGON.

Witnesses:
FRANÇOIS SERGENT,
W. McK. MILNEY.

Copies of this patent may be obtained for five cents each, by addressing the "Commissioner of Patents Washington, D. C."